Dec. 30, 1924.
C. S. OLDROYD
1,521,313
MECHANISM FOR TRANSMITTING MOTION
Filed Nov. 14, 1919   2 Sheets-Sheet 1
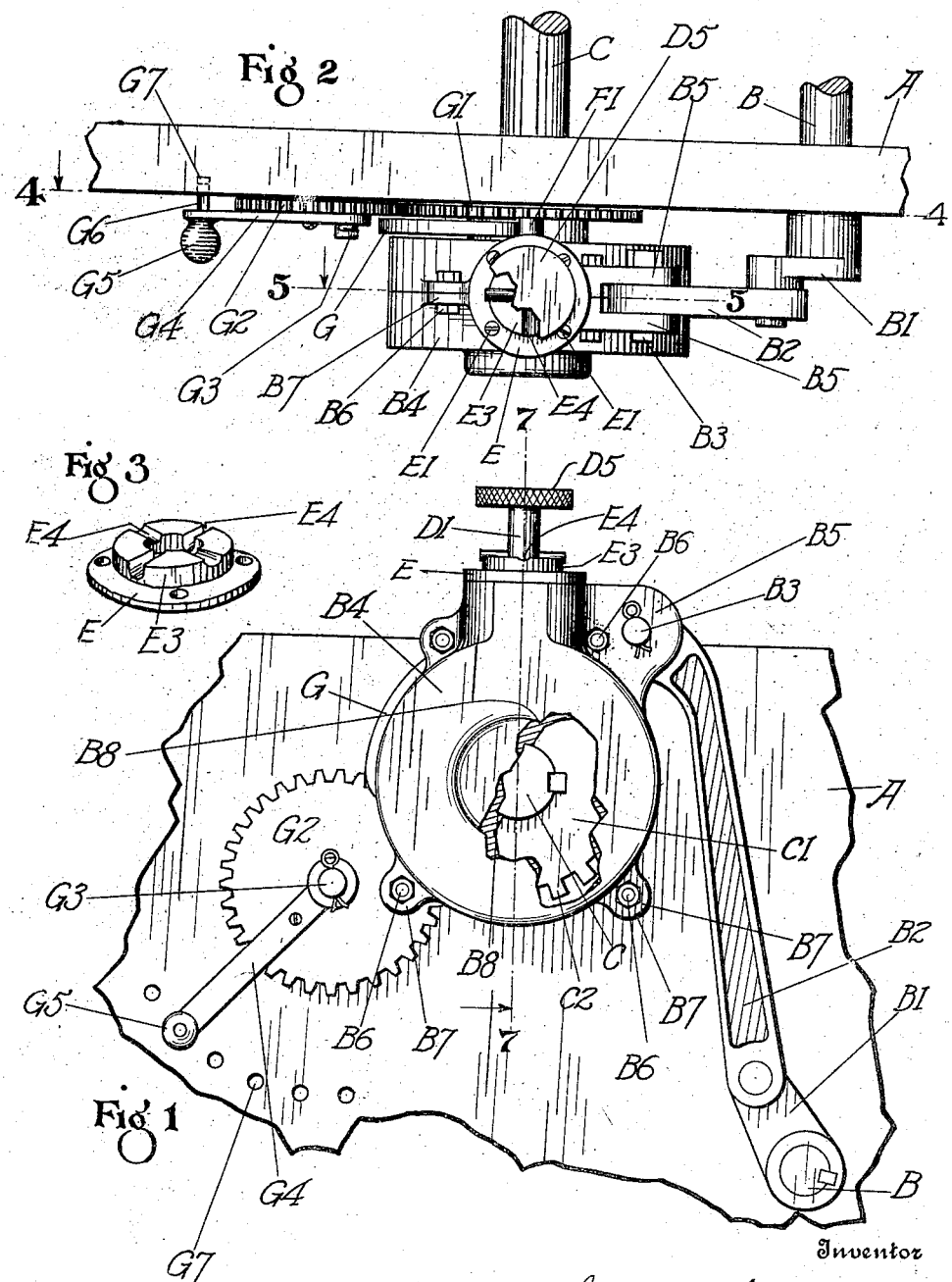

Dec. 30, 1924.
C. S. OLDROYD
1,521,313
MECHANISM FOR TRANSMITTING MOTION
Filed Nov. 14, 1919  2 Sheets-Sheet 2
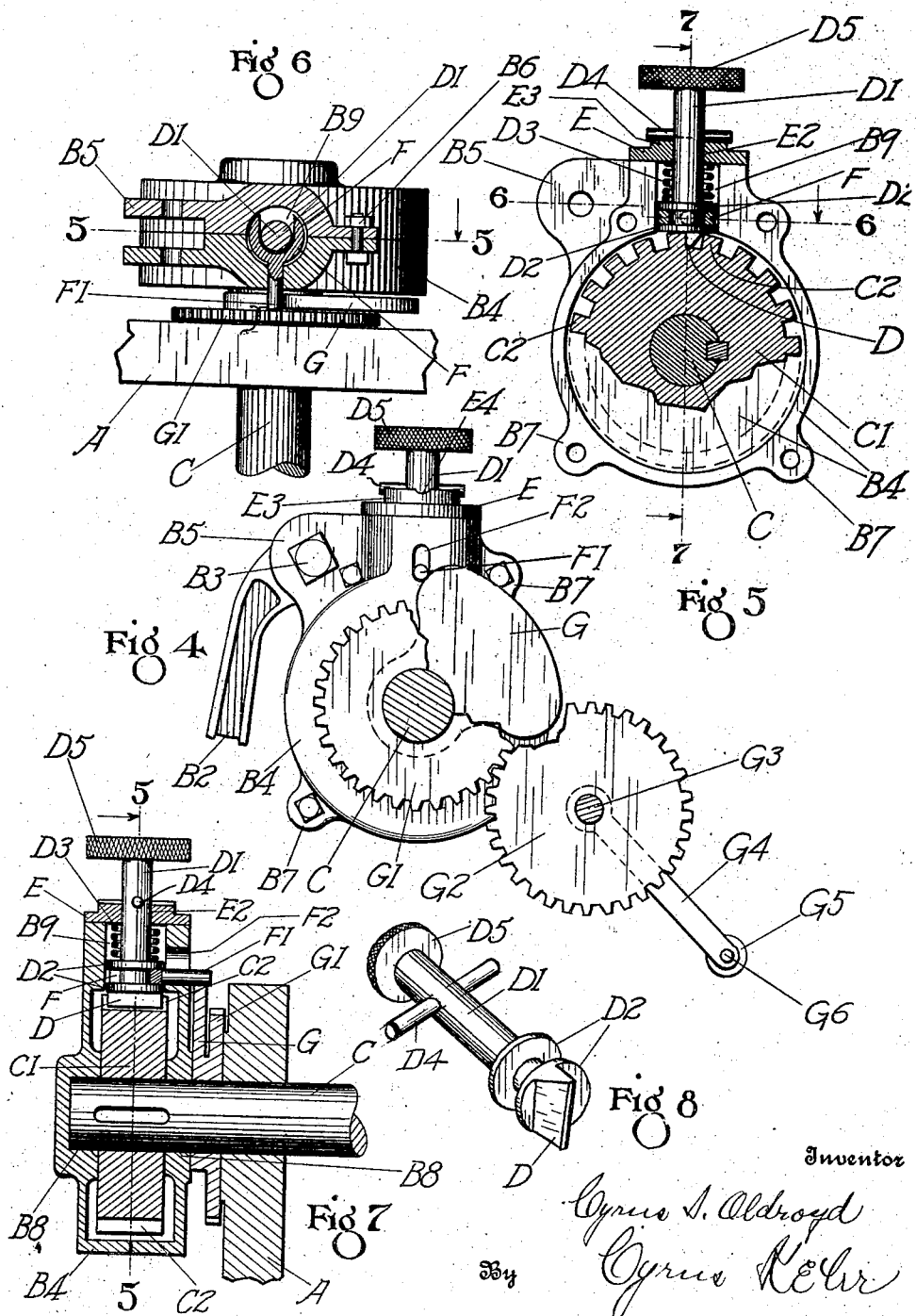

Patented Dec. 30, 1924.

1,521,313

UNITED STATES PATENT OFFICE.

CYRUS S. OLDROYD, OF CINCINNATI, OHIO.

MECHANISM FOR TRANSMITTING MOTION.

Application filed November 14, 1919. Serial No. 338,065.

*To all whom it may concern:*

Be it known that I, CYRUS S. OLDROYD, a citizen of the United States, residing at Cincinnati, in the county of Hamilton and State of Ohio, have invented a new and useful Improvement in Mechanism for Transmitting Motion, of which the following is a specification, reference being had to the accompanying drawing.

My improvement relates particularly to mechanism for transmitting motion from a first shaft to a second shaft.

The object of the invention is to provide a simple and effective mechanism whereby the transmission of motion from the first shaft to the second shaft may be at different velocities and in either direction or entirely suspended at the will of the operator.

In the accompanying drawings,

Fig. 1 is a side elevation of a part of the wall of a machine to which my improved mechanism is applied;

Fig. 2 is a plan of the mechanism shown by Fig. 1, a part being broken away;

Fig. 3 is a perspective view of a plate concerned with the control of the pawl;

Fig. 4 is a section on the line, 4—4, of Fig. 2, looking in the direction of the arrow;

Fig. 5 is a section on the line, 5—5, of Figs. 2, 6 and 7 looking in the direction of the arrows;

Fig. 6 is a horizontal section on the line, 6—6, of Fig. 5;

Fig. 7 is an upright section on the line, 7—7, of Figs. 1 and 5, looking toward the right.

Fig. 8 is a perspective of the pawl and pawl stem.

Referring to said drawings, A is an upright wall of a machine having horizontal and parallel shafts, B and C, extending through and having bearings in said wall.

The shaft, B, is rotated in either direction by means not shown, and transmission is from said shaft to the shaft, C.

On the end of the shaft, B, which projects through the front of the wall, A, as shown in Figs. 1 and 2, is a crank, $B^1$, rigid with said shaft. Fixed on the shaft, C, is a ratchet wheel, $C^1$, which is to receive motion from the pawl, D, said pawl engaging the teeth, $C^2$, of said wheel. Said teeth are symmetrical and adapted to be engaged by the pawl for turning the wheel in either direction, one side of the pawl being slanting and the other side being upright or radial to said wheel, so that when the pawl is moved to bear said upright face against a tooth, the latter will be moved with the pawl, and so that when the slanting face of the pawl is pressed against the tooth, said slanting face will slide upward and forward over said tooth, the pawl making its movement without moving the tooth. The pawl is supported by the pawl stem, $D^1$, which is supported in the rocking structure which will now be described.

The rocking structure, $B^4$, surrounds the ratchet wheel, $C^1$, and has bearings, $B^8$, at each side of the ratchet wheel to receive the shaft. By this means, the rocking structure is journaled for rocking on the shaft. Said structure consists of two disk-form parts meeting in a plane which is parallel to the front face of the wall, A. On each of said parts are ears, $B^7$, through which extend horizontal binding bolts, $B^6$, whereby said parts are secured immovably to each other. On each of said parts is an ear, $B^5$. The upper end of the pitman, $B^2$, extends between said ears and is there coupled by the pintle, $B^3$, extending through said ears and said pitman. The other end of said pitman is coupled to the crank, $B^1$. Every rotation of the crank imparts a reciprocation to the pitman, and such reciprocation turns the rocking structure first in one direction and then in the other through a range corresponding to the radius of the crank.

In the upper part of the rocking structure is formed a chamber, $B^9$, in which rests the lower end of the pawl stem, $D^1$. A cap, E (shown in perspective in Fig. 3), is seated across the upper end of said chamber and secured to the structure, $B^4$, by screws, $E^1$. In said cap, E, is a bearing, $E^2$, for the stem, $D^1$. In the lower part of said chamber, the stem has two annular ribs, $D^2$, the lower of which is even with the adjacent end of the stem and with the latter rests on the teeth of the ratchet wheel. A fork, F, rests between said ribs within said chamber and the stem, $F^1$, of said fork extends rearward (toward the wall, A) through the upright slot, $F^2$, in the wall of the rocking structure, said slot allowing upright movement of the stem. Above the upper of said ribs, the stem, $D^1$, is surrounded by an expanding coiled spring, $D^3$, which bears downward against said rib and upward against the cap, E, whereby the stem is normally pressed downward yieldingly. The cap, E, has a raised part, $E^3$, around the bearing, $E^2$. In the upper face of said raised part are grooves, $E^4$, which are radial to said bearing and spaced on the quarters of a circle. On the stem, $D^1$, is a cross-arm, $D^4$, which is adapted to rest in the grooves, $E^4$, when the stem is turned so as to bring the cross-arm above two of the grooves. One pair of said grooves are deep enough to allow the pawl to extend between the teeth of the ratchet wheel when the cross-arm is in those grooves; and the other pair of grooves are not deep enough to permit the pawl to extend between the ratchet teeth when the cross-arm is in those grooves. These grooves are so positioned on the cap and the cross-arm is so positioned on the stem as to permit the cross-arm to enter the deep grooves when the pawl is parallel to the ratchet teeth and so as to bring the cross-arm into the shallow grooves when the pawl is crosswise of the ratchet teeth. The engagement of the arm in the grooves serves the double function of limiting the downward movement of the stem and to prevent the turning of the pawl after it has been brought into the desired position relative to the ratchet teeth—either parallel to or transverse to the ratchet teeth. When the cross-arm has entered a pair of grooves, the downward pressure of the spring on the stem tends to keep the cross-arm in those grooves. On the upper end of the stem, $D^1$, is a head, $D^5$, to be grasped by the fingers of the operator for lifting and turning said stem. It is to be observed that the stem is free to turn in either direction after it has been lifted high enough to disengage the pawl, D, from the teeth, $C^2$, and to disengage the cross-arm from the grooves, $E^4$, the stem turning freely in the fork, F. When the stem has been thus lifted, it may be turned so as to allow the slanting face of the pawl to face toward the right or toward the left or so as to bring the pawl crosswise of the ratchet teeth. The pawl is long enough in the horizontal direction to extend across the space between two ratchet teeth and rest upon said teeth when the pawl is crosswise of the teeth. In this latter position, the pawl may be reciprocated horizontally by the rocking of the rocking structure without engaging the ratchet teeth for moving the latter, the pawl merely sliding on the upper ends of said teeth. Under that condition there is no transmission from the pitman, $B^2$.

Thus provision is made for making the pawl operate in either direction or to suspend operation, at the will of the operator. Operator-controlled adjustable mechanism is also provided for lifting the pawl during a part of the rocking movement of the rocking structure, in order that the engagement of the pawl with the ratchet wheel will exist only during a part of the rocking of the rocking structure, in order that the ratchet wheel may be turned through a range which is less than the range through which the rocking structure turns.

On the shaft, C, between the rocking structure and the wall, A, is a cam, G, which is loose on said shaft but rigid with a spur gear wheel, $G^1$, which also loosely surrounds said shaft between the cam and the wall, A. Said spur gear wheel meshes with a spur gear wheel, $G^2$, which is mounted for rotation on a stationary shaft, $G^3$, which projects forward from the wall, A. On said wheel is a crank, $G^4$, which has a handle, $G^5$. Behind the handle is a lug, $G^6$, which is adapted to rest in any one of the sockets, $G^7$, on the wall, A, said sockets being in a semi-circle which is concentric to the shaft, $G^3$. The crank, $G^4$, is flexible and the lug, $G^6$, normally rests in one of the sockets, $G^7$. The operator may force the outer part of the crank away from the wall, A, sufficiently to permit turning the crank on the shaft, $G^3$, until the lug, $G^6$, enters another socket. By this means the spur gear wheel, $G^2$, is given a partial rotation, and thereby the spur gear wheel, $G^1$, and the cam, G, are given a partial rotation. In this way the cam may be so set as to be entirely out of the path of the stem, $F^1$, of the fork, whereby said stem, $F^1$, and the pawl stem, $D^1$, are free to be pressed downward by the spring, $D^3$, the pawl during the full range of its movement in one direction carrying the ratchet wheel through the same range in the same direction. Or the cam may be so turned as to extend into any desired portion of the path of the fork stem, $F^1$.

By way of summary, it is now stated that the shaft, B, rotates constantly in either direction, and that motion causes the reciprocation of the pitman, B, through a fixed range, and that causes the rocking of the rocking structure through a fixed range. Whether the rocking of the rocking structure causes the turning of the ratchet wheel depends upon whether the pawl is turned to bring its working face parallel to the teeth of the ratchet wheel or whether the pawl is turned crosswise of and rests upon the teeth. If the latter, no motion is transmitted to the ratchet wheel. If the former, motion is transmitted to the ratchet wheel in the direction of the radial face of the pawl. If the motion of the ratchet wheel is to be reversed, the operator pulls the pawl stem upward and turns it half way around and then releases it. If the transmission is to be at its maximum—the pawl engaging the ratchet wheel during the entire range of the movement of the pawl—the crank, $G^4$, is set so as to place the cam, G, entirely outside of the path of the fork stem, $F^1$. If there is to be a reduction of the transmission to the shaft, C, the lug, $G^6$, of the crank, $G^4$, is shifted into engagement with another of the sockets, $G^7$.

I claim as my invention,

1. In a mechanism of the nature described, the combination of a ratchet wheel mounted for rotation, a rocking structure mounted to rock on the axial line of said wheel, a pawl and pawl stem mounted approximately radial to the axis of the ratchet wheel to permit endwise movement toward and from the ratchet wheel and to be turned on the axis of said stem, means yieldingly pressing said pawl toward said wheel, and adjustable means adapted to lift said stem endwise during a part of each movement of the rocking structure, substantially as described.

2. In a mechanism of the nature described, the combination of a ratchet wheel mounted for rotation, a rocking structure mounted to rock on the axial line of said wheel, a pawl and pawl stem mounted approximately radial to the axis of the ratchet wheel to permit endwise movement toward and from the ratchet wheel and to be turned on the axis of said stem, a lateral arm in engagement with said stem, means yieldingly pressing said pawl toward said wheel, and adjustable means adapted to lift said arm during a part of each movement of the rocking structure, whereby the stem and pawl are lifted out of the working position during such parts of the movements of the rocking structure, substantially as described.

3. In a mechanism of the nature described, the combination of a ratchet wheel mounted for rotation, a rocking structure mounted to rock on the axis of said wheel, a pawl and pawl stem mounted approximately radial to the axis of the ratchet wheel to permit endwise movement toward and from the ratchet wheel and to be turned on the axis of said stem and said stem bearing two annular ribs, a lateral arm extending between said ribs to make engagement compelling said arm and said stem to move up and down in unison but to permit rotation of the stem relative to said arm, means yieldingly pressing said pawl toward said wheel, and adjustable means adapted to lift said arm during a part of each movement of the rocking structure, whereby the stem and pawl are lifted out of the working position during such parts of the movements of the rocking structure, substantially as described.

4. In a mechanism of the nature described, the combination of a ratchet wheel mounted for rotation, a rocking structure mounted to rock on the axial line of said wheel, a pawl and pawl stem mounted approximately radial to the axis of the ratchet wheel and to permit endwise movement toward and from the ratchet wheel and to be turned on the axis of said stem, whereby the pawl may be set for engagement with the teeth of the ratchet wheel during either the forward or return movement of the rocking structure, yielding means tending to move the pawl and stem toward the wheel, means for limiting the movement of the pawl toward the wheel when the pawl is in either of its two working positions and holding the pawl against turning while the pawl is in either of its two working positions, means for continuously holding the pawl far enough from the wheel axis to bring the pawl out of the path of the teeth of the wheel, and adjustable means adapted to lift the stem endwise during a part of each movement of the rocking structure, substantially as described.

5. In a mechanism of the nature described, the combination of a ratchet wheel mounted for rotation, a rocking structure mounted to rock on the axial line of said wheel, and said rocking structure comprising a body divided into two parts along a plane to which said axial line is perpendicular, and said sections having ears, bolts joining said ears, a pawl supported on said rocking structure for rotation and endwise movement, yielding means tending to move said pawl toward said wheel, and means for limiting the movement of the pawl toward the wheel, substantially as described.

6. In a mechanism of the nature described, the combination of a ratchet wheel mounted for rotation, a rocking structure mounted to rock on the axial line of said wheel, and said rocking structure comprising a body divided into two parts along a plane to which said axial line is perpendicular, and said sections having ears, bolts, joining said ears, a cap seated on said body and having a bearing, a pawl supported on said rocking structure and having its stem in said bearing for rotation and endwise movement, yielding means tending to move said pawl toward said wheel, and means for limiting the movement of said pawl toward the wheel, substantially as described.

7. In a mechanism of the nature described, the combination of a ratchet wheel mounted for rotation, a rocking structure mounted to rock on the axial line of said wheel, and said rocking structure comprising a body divided into two parts along a plane to which said axial line is perpendicular, and said sections having ears, bolts joining said ears, and said parts having other ears, a pitman coupled to said ears, a pawl supported on said rocking structure for rotation and endwise movement, yielding means tending to move said pawl toward said wheel, and means for limiting the movement of the pawl toward the wheel, substantially as described.

8. In a mechanism of the nature described, the combination of a ratchet wheel mounted for rotation, a rocking structure mounted to rock on the axial line of said wheel, a pawl supported in said rocking structure for rotation and endwise movement, yielding means tending to move said pawl toward said wheel, a fork having a stem extending laterally from the pawl and said fork engaging the pawl to permit turning of the pawl independently of said fork but to compel up-and-down movement with said fork and means adapted to lift said fork stem during a part of the movement of the rocking structure, substantially as described.

9. In a mechanism of the nature described, the combination of a ratchet wheel mounted for rotation, a rocking structure mounted to rock on the axial line of said wheel, a pawl supported in said rocking structure for rotation and endwise movement and said pawl having two annular ribs, yielding means tending to move said pawl toward said wheel, a stem extending laterally from the pawl and having a fork extending between said annular ribs to permit turning of the pawl independently of said fork but to compel up-and-down movement of said fork and means adapted to lift said fork stem during a part of the movement of the rocking structure, substantially as described.

10. In a mechanism of the nature described, the combination of a ratchet wheel mounted for rotation, a rocking structure mounted to rock on the axial line of said wheel, a pawl and pawl stem mounted approximately radial to the axis of the ratchet wheel to permit endwise movement toward and from the ratchet wheel and to be turned on the axis of said stem, means yieldingly pressing said pawl toward said wheel, and an adjustable cam adapted to lift said stem endwise during a part of the movement of the rocking structure, substantially as described.

11. In a mechanism of the nature described, the combination of a ratchet wheel mounted for rotation, a rocking structure mounted to rock on the axial line of said wheel, a pawl and pawl stem mounted approximately radial to the axis of the ratchet wheel to permit endwise movement toward and from the ratchet wheel and to be turned on the axis of said stem, means yieldingly pressing said pawl toward said wheel, an adjustable cam adapted to lift said stem endwise during a part of the movement of the rocking structure, and operator-controlled means for adjusting said cam, substantially as described.

In testimony whereof I have signed my name this 24th day of October, in the year one thousand nine hundred and nineteen.

CYRUS S. OLDROYD.